(12) United States Patent
Okadome et al.

(10) Patent No.: US 11,707,844 B2
(45) Date of Patent: Jul. 25, 2023

(54) ROBOT CONTROL SYSTEM AND ROBOT CONTROL METHOD

(71) Applicant: Hitachi, Ltd., Tokyo (JP)

(72) Inventors: Yuya Okadome, Tokyo (JP); Ryo Sakai, Tokyo (JP); Toshiko Aizono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 197 days.

(21) Appl. No.: 17/183,454

(22) Filed: Feb. 24, 2021

(65) Prior Publication Data

US 2021/0268654 A1 Sep. 2, 2021

(30) Foreign Application Priority Data

Feb. 28, 2020 (JP) ................. 2020-033546

(51) Int. Cl.
*B25J 9/16* (2006.01)
*B25J 13/08* (2006.01)

(52) U.S. Cl.
CPC .............. *B25J 9/1666* (2013.01); *B25J 9/163* (2013.01); *B25J 13/089* (2013.01)

(58) Field of Classification Search
CPC ........ B25J 9/1666; B25J 9/163; B25J 13/089; B25J 15/12
See application file for complete search history.

(56) References Cited

U.S. PATENT DOCUMENTS

| | | | |
|---|---|---|---|
| 2011/0160908 A1* | 6/2011 | Iba .................. | B25J 9/1679 700/262 |
| 2016/0129591 A1* | 5/2016 | Kanemoto ........... | B25J 9/1635 700/254 |
| 2019/0240833 A1* | 8/2019 | Kimura .............. | B25J 9/0081 |

OTHER PUBLICATIONS

Limon, Daniel, J. Calliess, and Jan Marian Maciejowski. "Learning-based nonlinear model predictive control." IFAC—PapersOnLine 50.1 (2017): 7769-7776. (Year: 2017).*
Yuya Okadome, et al., "A confidence-based roadmap using Gaussian process regression", Autonomous Robots, 2017, vol. 41, No. 4.

* cited by examiner

*Primary Examiner* — Jeff A Burke
*Assistant Examiner* — Blake A Wood
(74) *Attorney, Agent, or Firm* — Mattingly & Malur, PC

(57) ABSTRACT

A robot control system includes a state candidate generation unit that generates a state candidate that is a state transition destination of a robot at next time, a control amount estimation unit that estimates a control amount for transitioning to the state candidate, a state candidate evaluation unit that calculates a distance between the target state of the robot and the state candidate, calculates a coincidence degree between (i) a state at next time estimated from a state at current time of the robot and the control amount and (ii) the state candidate, and sets a sum of the distance and the coincidence degree to be an evaluation value, and a selection unit that selects a state candidate with a minimum evaluation value from state candidates and generate a motion corresponding to the selected state candidate.

8 Claims, 11 Drawing Sheets

ROBOT CONTROL SYSTEM AND ROBOT CONTROL METHOD

CROSS-REFERENCE TO RELATED APPLICATIONS

The present application claims priority to Japanese Patent Application No. 2020-033546, filed Feb. 28, 2020. The contents of this application are incorporated herein by reference in their entirety.

BACKGROUND OF THE INVENTION

1. Field of the Invention

The present invention relates to a robot control system and a robot control method, and is particularly suitable for a flexible robot having nonlinearity.

2. Description of the Related Art

During expansion of an application range of a robot, the robot used in industry has many high-output applications in, for example, an assembly process of an automobile, while there are no many applications for handling of soft and deformed objects such as food and clothes. If the robot can handle a flexible object in this way, it is possible to further expand an application target of the robot, such as the introduction of the robot not only in a factory but also in, for example, cooking at home.

Here, as a related art, there is a simple technique called "rapidly exploring random tree" that combines randomly generated robot motions, but a powerful and elaborate model is required to find an answer. There is a technique called "model predictive trajectory planner" that uses a route itself as a parameter (a via-point, etc.) to achieve the optimization, which is effective in a mobile robot. Furthermore, there is a technique called "confidence based roadmap" that models a robot movement in a Gaussian process and achieves application to a reaching motion ("A Confidence-based Roadmap Using Gaussian Process Regression" p. 1013-1026, Autonomous Robots, Vol. 41, No. 4, 2017. 4.).

A robot in the related art can basically only perform a motion planning of a simple system, and it is difficult for the robot to grip a soft and easily deformable object. One reason is that it is not easy to model a movement of a flexible robot having nonlinearity (hereinafter, referred to as "soft robot").

For example, in a case of handling by a flexible robot hand (hereafter, referred to as "soft hand"), the nonlinearity caused by a physical property of a material of the soft hand, delay of pneumatic pressure, etc. becomes a problem, and it is difficult to identify dynamics since the robot itself is deformed. Therefore, a motion generation/planning for such a soft robot is also not easy.

When a specific input is provided by many robot hands, many motions such as closing/opening the robot hands are determined motions, and thus it is not easy to generate a motion such as causing a finger of a robot to reach to a specific position.

SUMMARY OF THE INVENTION

Therefore, an object of the invention is to provide a robot motion planning method that reduces the number of modeling processes of a soft robot, generates motions even other than a reaching motion with high accuracy, and facilitates modeling.

In order to solve the above-mentioned problem, the invention provides a robot control system including a state candidate generation unit configured to generate a state candidate that is a state transition destination of a robot at next time, a control amount estimation unit configured to estimate a control amount for transitioning to the state candidate, a state candidate evaluation unit configured to calculate a distance between the target state of the robot and the state candidate, calculate a coincidence degree between (i) a state at next time estimated from a state at current time of the robot and the control amount and (ii) the state candidate, and set a sum of the distance and the coincidence degree as an evaluation value, and a selection unit configured to select a state candidate with a minimum evaluation value from state candidates and generate a motion corresponding to the selected state candidate.

According to the invention, the number of the modeling processes of the soft robot can be reduced, and the motions even other than the reaching motion can be generated with high accuracy. In addition, it is possible to provide a robot motion planning method that facilitates modeling, and it is possible to expand an automation area of the robot.

DESCRIPTION OF THE PREFERRED EMBODIMENTS

First, modeling and motion planning used for a robot according to the invention will be described before describing an embodiment as a mode for carrying out the invention.

Figure 1:
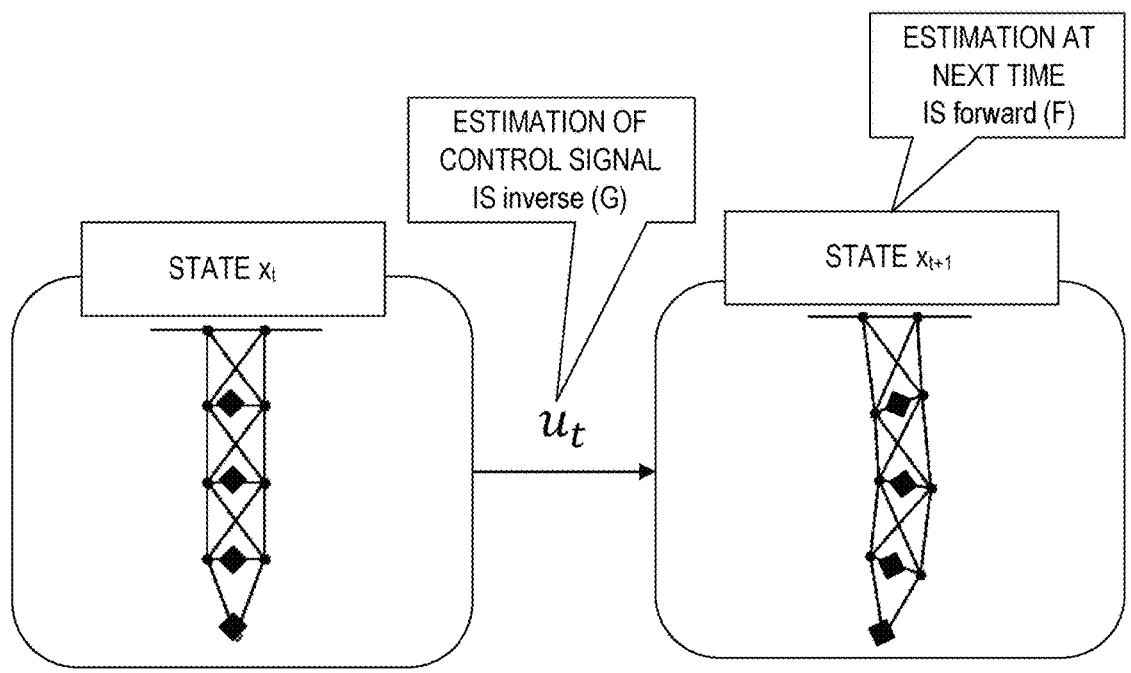
FIG. 1 is a diagram showing state estimation of a robot.

FIG. 1 is a diagram showing state estimation of a robot. For the state estimation of a robot, forward dynamics and inverse dynamics are used as two types of a state estimator.

Hereinafter, forward dynamics (hereinafter, referred to as "F dynamics") will be expressed as (Equation 1).

$$x_{t+1} = F(x, u) \quad \text{(Equation 1)}$$

Inverse dynamics (hereinafter, referred to as "G dynamics") will be expressed as (Equation 2).

$$u_t = G(x_t, x_{t+1}) \quad \text{(Equation 2)}$$

Here, x represents a state and u represents a control signal, and a control signal is, for example, a voltage signal (voltage command value) for operating (displacing) a fingertip of a robot finger.

The F dynamics is used to estimate a next state ($x_{t+1}$), and the G dynamics is used to estimate the control signal ($u_t$). In many motion planning methods, the G dynamics is the main method. An interpolated point of the next state ($x_{t+1}$) is generated by linear approximation or the like, and the control signal ($u_t$) is determined by the G dynamics.

As will be described later, the invention uses not only the G dynamics but also the F dynamics in the motion planning as a state coincidence degree index.

Figure 2:
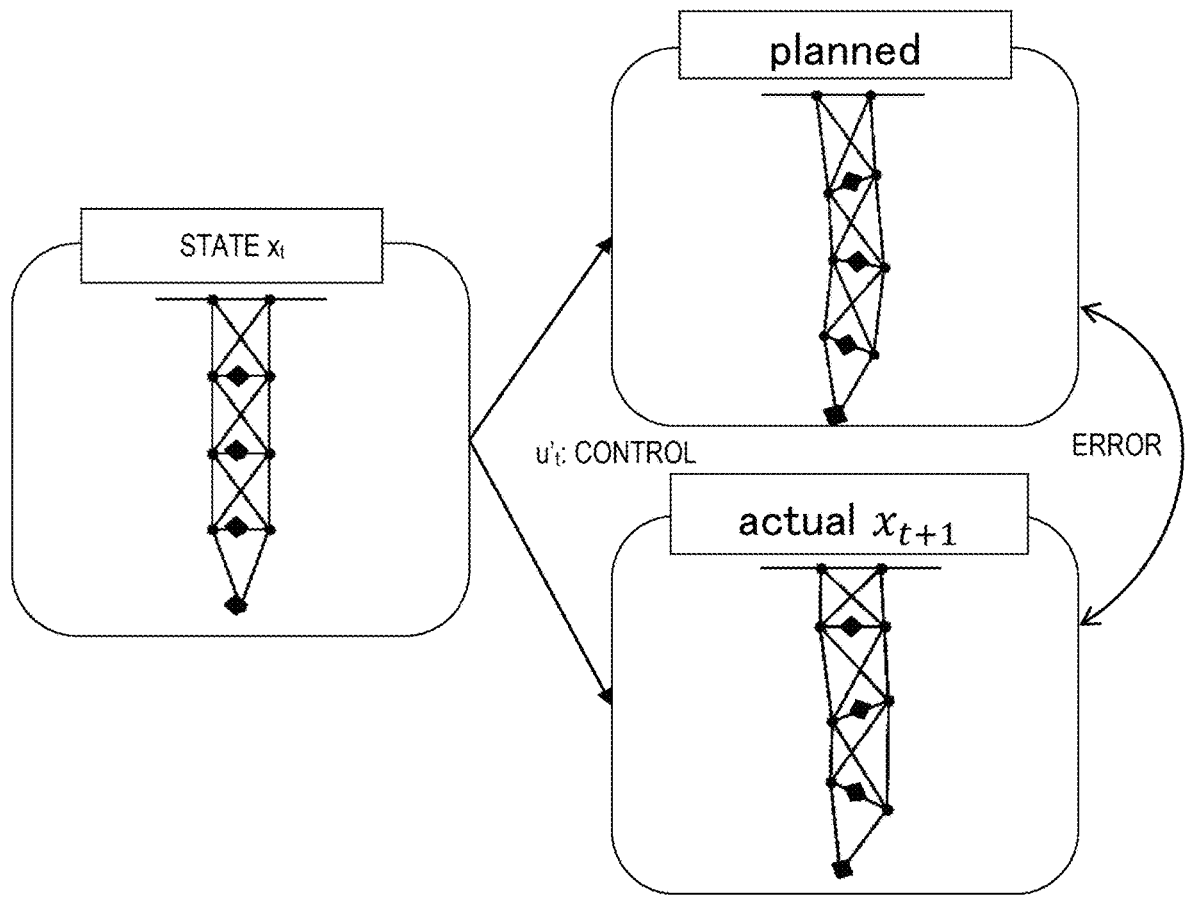
FIG. 2 is a diagram showing a problem of motion modeling of a robot according to the invention.

Subsequently, a viewpoint as a concept of the invention will be described. FIG. 2 is a diagram showing a problem of motion modeling of a robot according to the invention.

The invention uses a machine learning model for motion modeling of a robot, and uses a neural network (NN) as a representative example thereof in the following description. However, the invention is not limited to the neural network (NN), and a multi-layer perceptron (MLP), a linear regression model, or the like may be used as long as it is a machine learning model.

As shown in FIG. 2, when a state at current time ($x_t$) is changed to the next state ($x_{t+1}$) by the control signal ($u'_t$), an error occurs between a next state at planning time that is calculated from the motion planning (planned) by the neural network and a next state at execution time by an actual motion (actual).

Due to an error of the neural network, the error between the planning time and the execution time becomes large, and an executable solution cannot be implemented. The error accumulates more and more in the motion planning, the response of a robot system is non-linear, and thus it is also difficult to quantify an influence of the error of the neural network.

Therefore, the invention has been devised to introduce a coincidence degree index using the forward dynamics (F), which will be described later, into the motion planning.

Next, an outline of processing procedures according to the invention is shown. By executing the following procedures, it is possible to implement motion planning of a system in which modeling is difficult.

1. Randomly move a robot to collect data
2. Execute learning by a neural network using F and G dynamics
3. Define an initial state ($x_0$) and a final state ($x_T$)
4. Calculate a motion considering the coincidence degree index The calculation includes the following steps (4-a) and (4-b).

(4-a) Sample a state candidate ($x'_{t+1}$) at next time
(4-b) Select a state at the next time based on costs such as the coincidence degree index and a distance
5. Execute a planning motion A motion calculated from the selected state candidate in the above 4 is executed.

Figure 3:
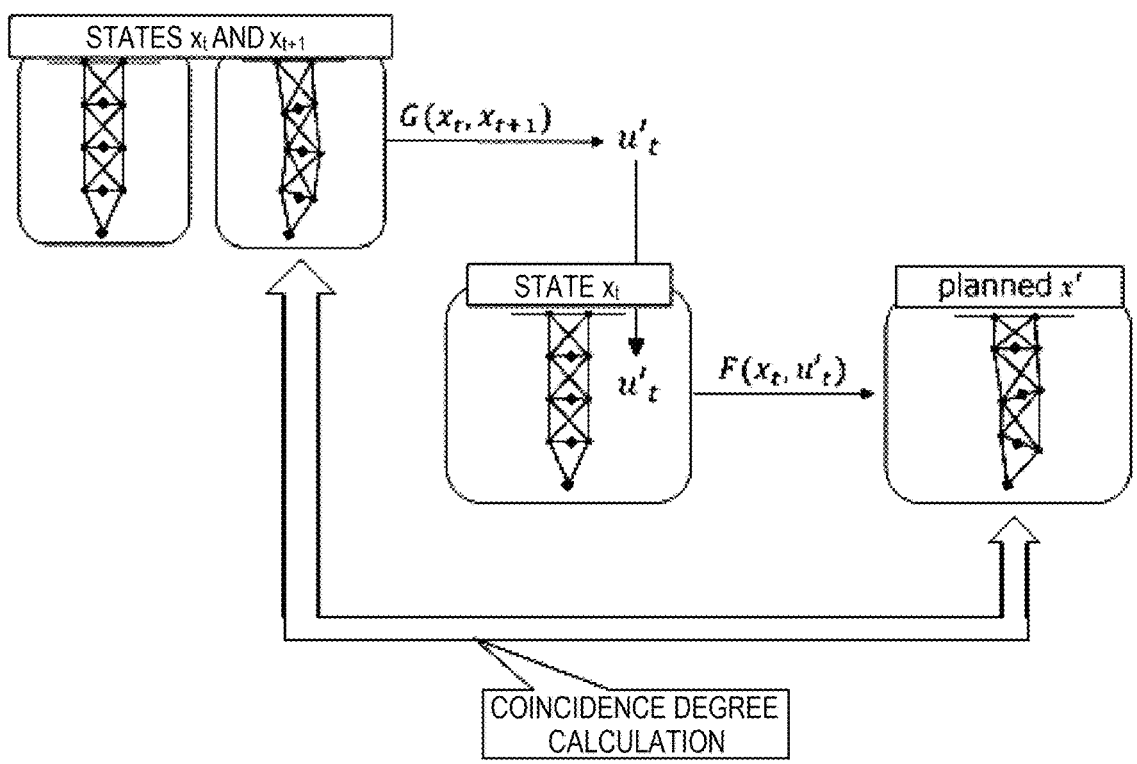
FIG. 3 is a diagram showing a schematic state transition when selecting a state candidate at next time.

Among the above five procedures, the motion considering the coincidence degree index in 4 is the viewpoint of the invention, which will be described in more detail. FIG. 3 is a diagram showing a schematic state transition when selecting a state candidate at next time.

Regarding (4-a), in order to obtain the control signal ($u'_t$) for the state at the next time, the state candidate at the next time is generated by sampling and the G dynamics is used. This is the transition shown in the upper left part of FIG. 3. At this time, the state candidate at the next time ($x'_{t+1}$) is efficiently sampled by a disk-shaped sampling centering on the state at the current time.

Figure 4:
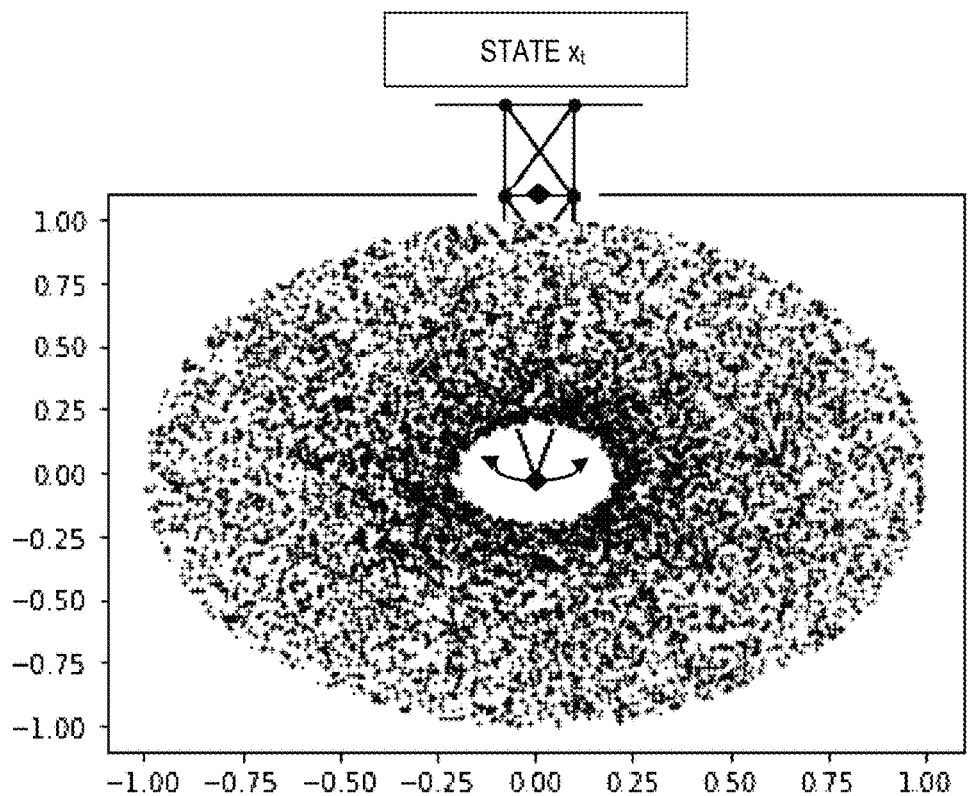
FIG. 4 is a diagram in which state candidates at the next time are displayed in dots by sampling centering on a state at current time.

FIG. 4 is a diagram in which state candidates at the next time are displayed in dots by sampling centering on the state at the current time ($x_t$). Within the disk-shaped dots, it is possible to select the state candidate at the next time, and it is possible to generate the state candidate at the next time in consideration of a minimum movement amount and a maximum movement amount.

Regarding (4-b), when the candidate at the next time is selected using the coincidence degree index, one point is selected from candidate points (sample points displayed in dots in a disk shape) at the next time of a target state generated by sampling in the above (4-a), the control signal ($u_t$) that can reproduce the state candidate at the next time is checked, and thereby the state at the next time ($x_{t+1}$) is selected. The coincidence degree index is introduced to consider an estimation error due to dynamics for the motion generation to the state at the next time ($x'_{t+1}$).

An evaluation function J(Π) to which the coincidence degree index is added is shown as (Equation 3) below.

$$J(\Pi) = \sum_{i=1}^{T} c(x_t, G(x_t, x_{t+1}), g) + \lambda \|x'_{t+1} - F(x_t, G(x_t, x'_{t+1}))\|_2 \quad \text{(Equation 3)}$$

Here, (Equation 4) to be added to a second item is the coincidence degree index, and can be implemented when it is a formula that can detect a difference such as exp (‖‖). λ is a constant.

$$|x'_{t+1} - F(x_t, G(x_t, x'_{t+1}))| \quad \text{(Equation 4)}$$

In a first item, (Equation 5) is a cost function, which indicates costs required to achieve a task motion such as distance.

$$c(x_t, G(x_t, x_{t+1}), g) \quad \text{(Equation 5)}$$

As the transition shown on the right side of FIG. 3, by using the obtained control signal ($u'_t$) to calculate the coincidence degree between the state (x') obtained by the F dynamics and the next state candidate ($x'_{t+1}$), the control signal ($u'_t$) is evaluated.

As described above, it is possible to avoid the state transition with a large estimation error by obtaining the control signal ($u_t$) that minimizes the evaluation function J (Π) in which the coincidence degree index is added to the above-mentioned cost function. In fact, when a state candidate point at next time is selected, a point where data is less and a point where the speed is too large are avoided.

Embodiment

Hereinafter, the embodiment as the mode for carrying out the invention will be described with reference to the drawings.

Figure 5:
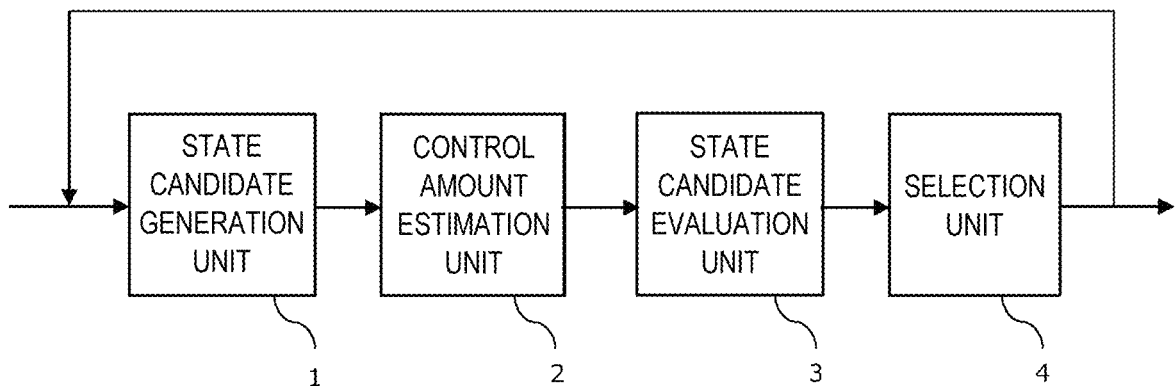
FIG. 5 is a diagram showing a configuration of a robot control system according to the invention.

FIG. 5 is a diagram showing a configuration of a robot control system according to the invention.

The robot control system according to the invention executes motion planning processing by using a state candidate generation unit 1, a control amount estimation unit 2, a state candidate evaluation unit 3, and a selection unit 4. Each of these components, or the entire control system, includes a processing unit and a storage unit (not shown). The processing unit is mainly a CPU, and a storage medium constituting the storage unit is not particularly limited, and may be a memory, a disk, etc. Furthermore, the control system can be provided with a display unit (not shown) for displaying the motion planning described later and an error associated therewith.

Next, a processing content executed by each component will be described in order. Here, "storage A", "storage B", "storage C", and "storage D" noted in flowcharts described below indicate a storage unit or storage area for storing or reading data, which correspond to the above-mentioned storage unit (not shown). Furthermore, an execution subject of the processing shown in each flowchart is a processing unit included by the above-mentioned components or a processing unit that uniformly executes as the control system, and notation of the subject will be omitted hereafter.

Figure 6:
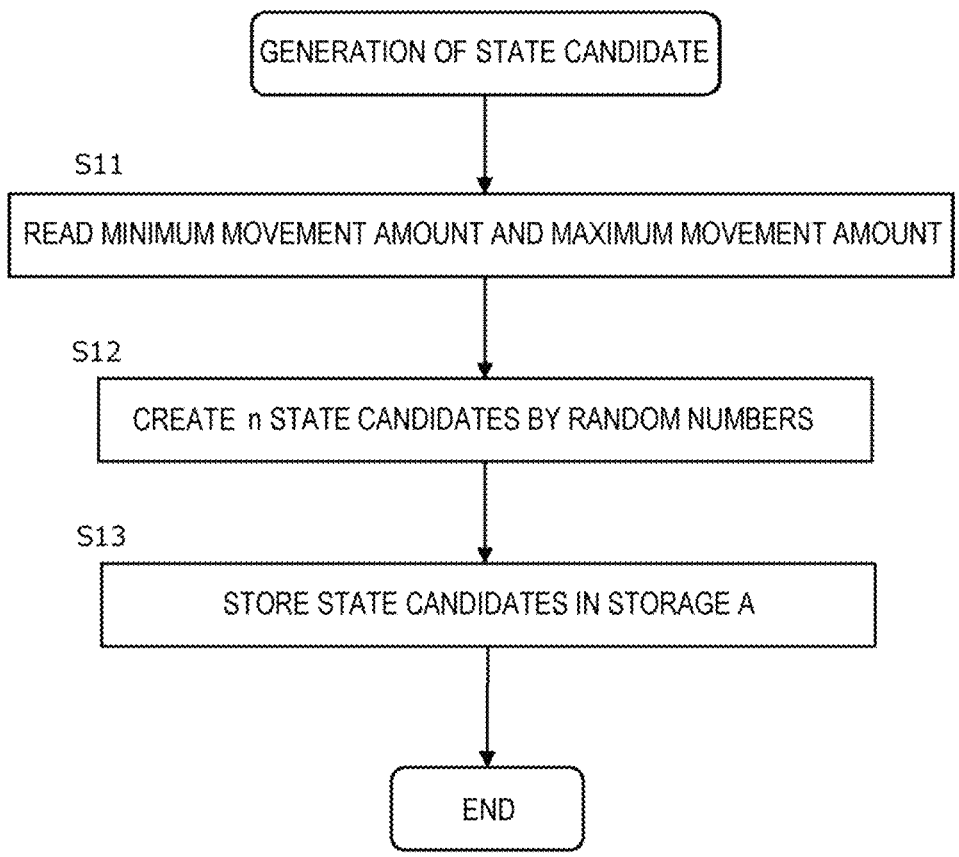
FIG. 6 is a diagram showing a flowchart of creation processing of a target state candidate executed by a state candidate generation unit.

FIG. 6 is a diagram showing a flowchart of creation processing of a target state candidate executed by the state candidate generation unit 1.

In step 11 (S11), the minimum movement amount and the maximum movement amount of the state are read.

In step 12 (S12), by using random numbers, n state candidates are created as state candidates at the next time.

The processing executed in the above-mentioned step 11 (S11) and step 12 (S12) correspond to the selection of the state candidate at the next time within the dots sampling in the disk shape shown in FIG. 3.

In step 13 (S13), the created state candidates at the next time are stored in the storage A.

Figure 7:
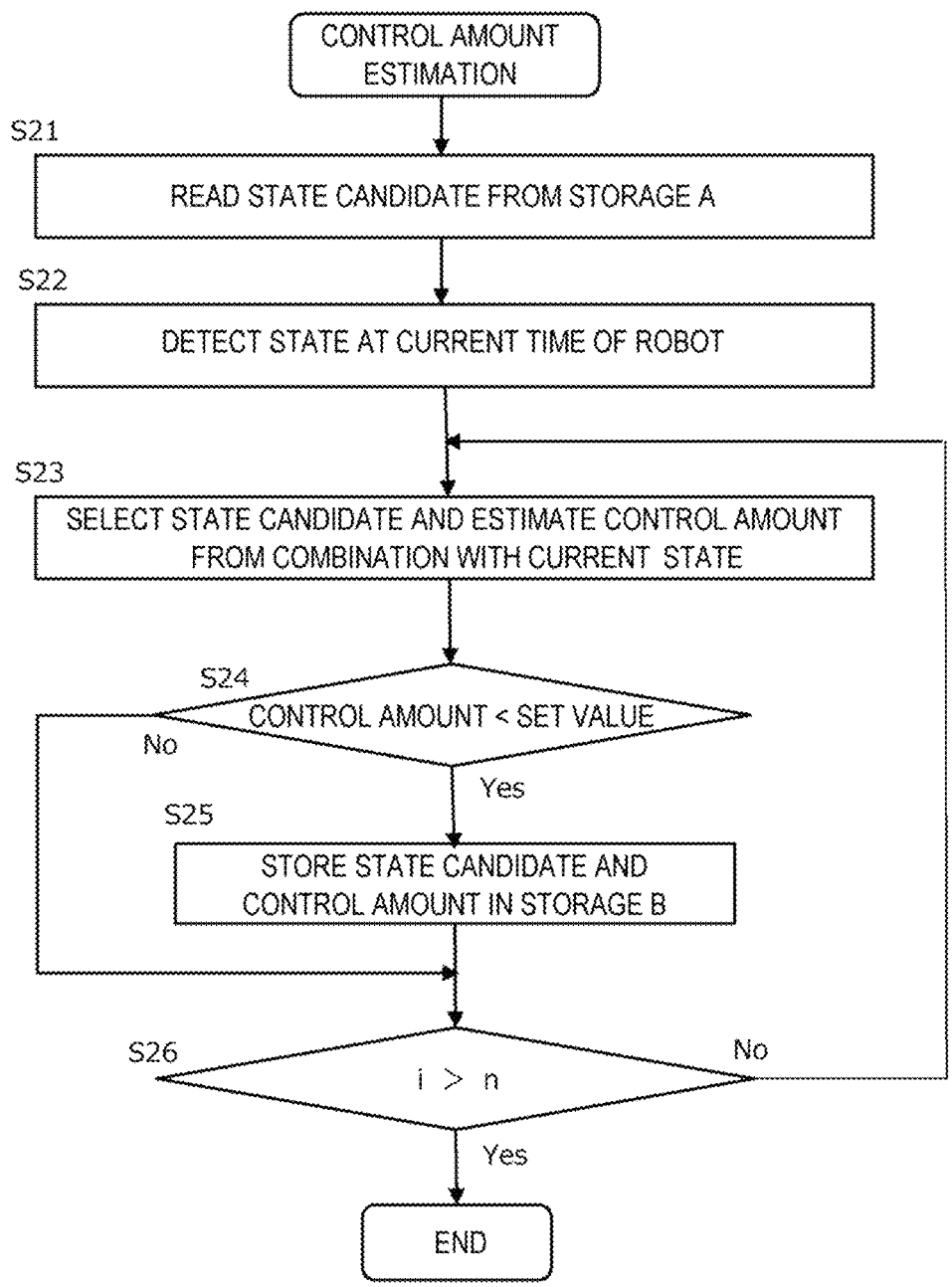
FIG. 7 is a diagram showing a flowchart of control amount estimation processing executed by a control amount estimation unit.

FIG. 7 is a diagram showing a flowchart of control amount estimation processing executed by the control amount estimation unit 2.

In step 21 (S21), a state candidate at next time generated and stored in the state candidate generation unit 1 is read from the storage A.

In step 22 (S22), the state at the current time ($x_t$) of the robot is detected and read.

In step 23 (S23), one of the state candidates at the next time read is selected from the storage A ($x_{t+1}$), and a control amount ($u'_t$) is estimated by the G dynamics from a combination with the detected state at the current time ($x_t$). The step 23 (S23) corresponds to the transition for obtaining the control amount ($u'_t$) shown in the upper left part of FIG. 4.

In step 24 (S24), the estimated control amount (hereinafter, referred to as "estimated control amount") is compared with a set value of the control amount to determine the magnitude relation.

If the estimated control amount is smaller than the set value (Yes), the state candidate ($x'_{t+1}$) and the estimated control amount ($u'_t$) are stored in the storage B in step 25 (S25), and then the process moves to step 26 (S26).

If the estimated control amount is equal to or greater than the set value (No), the process skips to step 26 (S26).

In step 26 (S26), whether an index i of the number of executed candidates has reached the number of generated candidates n is determined by comparing the magnitude of i and n. If i≤n (No), that is, if the processing for the generated number of candidates n is not executed, the process returns to step 23 (S23) to continue the processing. If i>n is satisfied (Yes), the processing ends.

Figure 8:
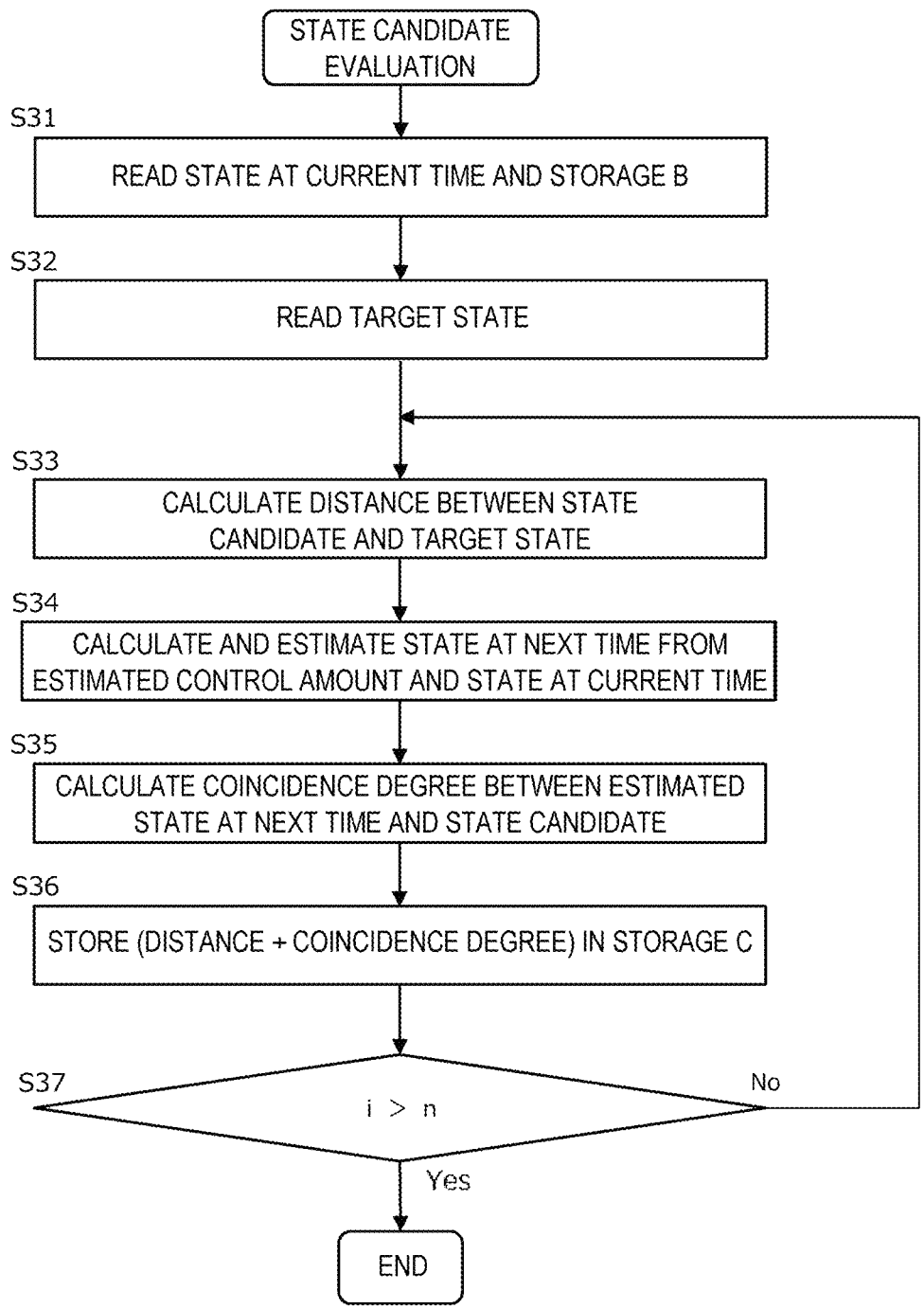
FIG. 8 is a diagram showing a flowchart of state candidate evaluation processing executed by a state candidate evaluation unit.

FIG. 8 is a diagram showing a flowchart of state candidate evaluation processing executed by the state candidate evaluation unit 3.

In step 31 (S31), the state at the current time (xt) of the robot detected earlier and data stored in the storage B (state candidate and stored control amount) are read.

In step 32 (S32), a target state is read.

In step 33 (S33), a distance between the state candidate ($x'_{t+1}$) read from the storage B and the target state is calculated.

In step 34 (S34), the state at the next time (x') is calculated and estimated from the estimated control amount ($u'_t$) read from the storage B and the state at the current time ($x_t$). The step 34 (S34) corresponds to the estimation of the next state using the F dynamics shown in the middle of FIG. 4.

In step 35 (S35), the coincidence degree between the estimated state at the next time (x') and the state candidate ($x'_{t+1}$) is calculated. The step 35 (S35) corresponds to a coincidence degree calculation shown in the lower part of FIG. 4.

In step 36 (S36), a sum (distance+coincidence degree) of the distance calculated in step 33 (S33) and the coincidence degree calculated in step 35 (S35) is stored in the storage C as an evaluation value J.

In step 37 (S37), whether or not the index i of the number of executed candidates has reached the number of generated candidates n is determined by comparing the magnitude of i and n. If i≤n (No), that is, if the processing for the generated number of candidates n is not executed, the process returns to step 33 (S33) to continue the processing. If i>n is satisfied (Yes), the processing ends.

Figure 9:
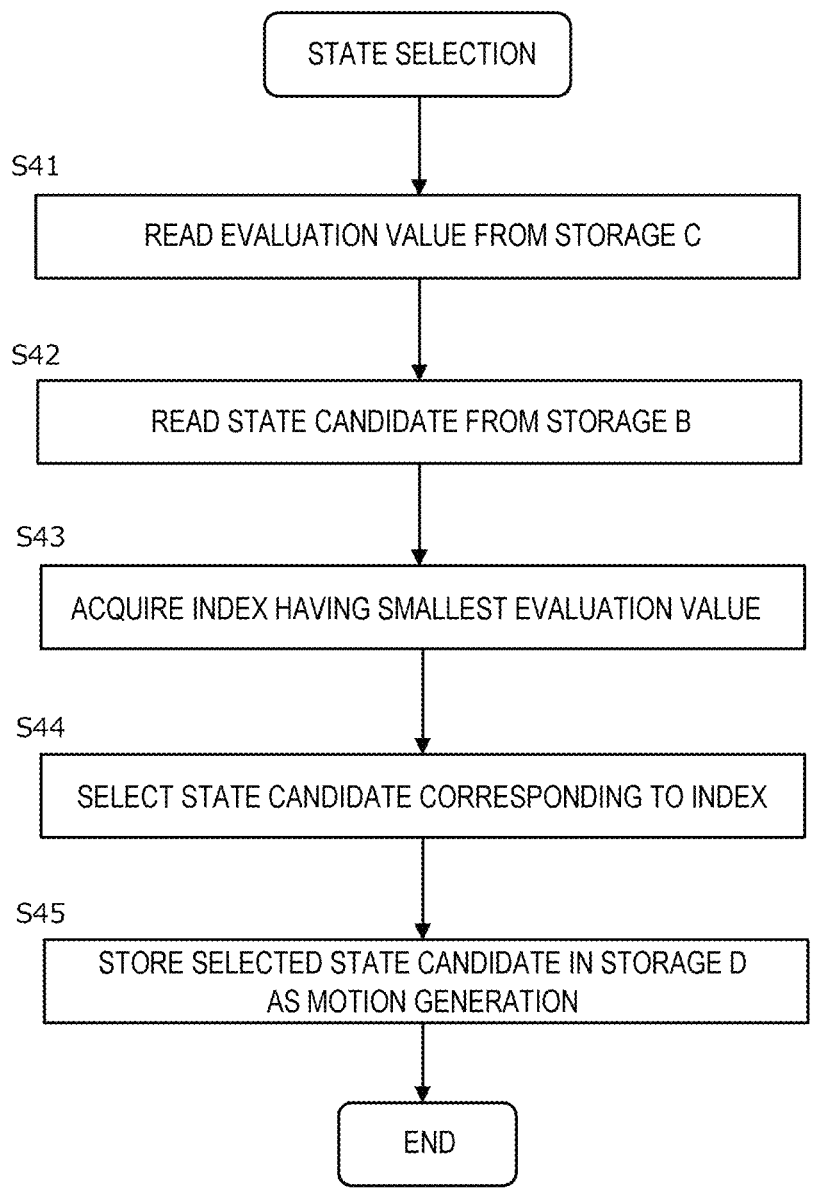
FIG. 9 is a diagram showing a flowchart of state selection processing executed by a selection unit.

FIG. 9 is a diagram showing a flowchart of state selection processing executed by the selection unit 4.

In step 41 (S41), the evaluation value J is read from the storage C.

In step 42 (S42), the state candidate ($x'_{t+1}$) is read from the storage B.

In step 43 (S43), the index i having a smallest evaluation value J is acquired.

In step 44 (S44), the state candidate ($x'_{t+1}$) corresponding to the acquired index i is selected.

In step 45 (S45), the selected state candidate ($x'_{t+1}$) is stored in the storage D as motion generation.

Figure 10:
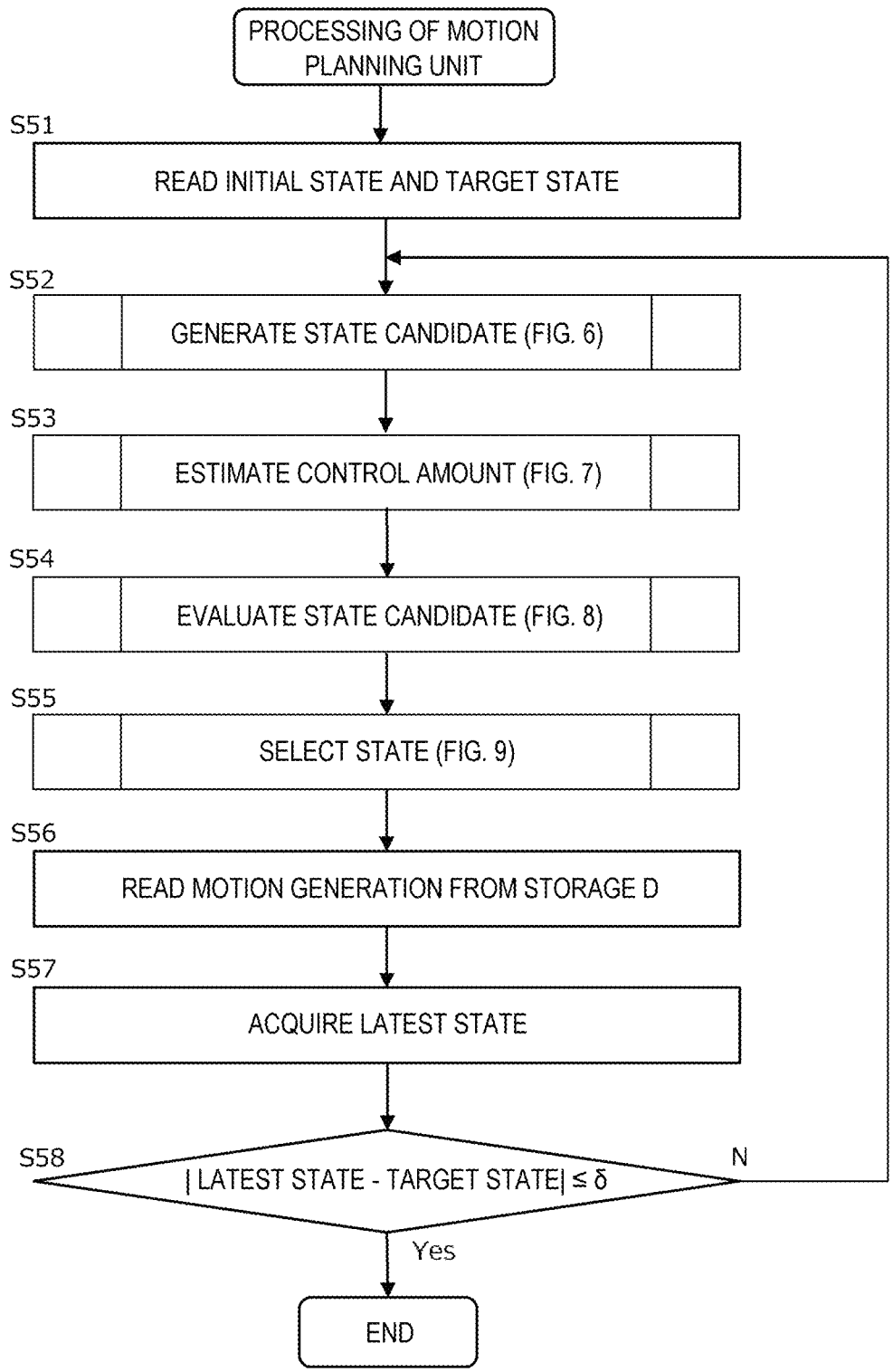
FIG. 10 is a diagram showing a flowchart of entire processing executed by a control system (motion planning unit) according to the invention.

FIG. 10 is a diagram showing a flowchart of entire processing executed by the control system (motion planning unit) according to the invention.

In step 51 (S51), an initial state and a target state of a target robot are read.

In step 52 (S52), the creation processing of the state candidate (S11 to S13) shown in FIG. 6 is executed.

In step 53 (S53), the estimation processing of the control amount (S21 to S26) shown in FIG. 7 is executed.

In step 54 (S54), the evaluation processing of the state candidate (S31 to S37) shown in FIG. 8 is executed.

In step 55 (S55), the selection processing of the state (S41 to S45) shown in FIG. 9 is executed.

In step 56 (S56), the motion generation stored in the storage B is read.

In step 57 (S57), a latest state obtained by the read motion generation is acquired.

In step 58 (S58), it is determined whether the deviation between the acquired latest state and the target state is within a predetermined range (δ). If the deviation is within the range (Yes), the processing ends, and if the deviation is out of the range (No), step 52 (S52) is returned and a series of processing is executed again.

Next, the motion planning and the control result with/without the coincidence degree index introduced in the invention are shown based on a simulation result.

Figure 11:
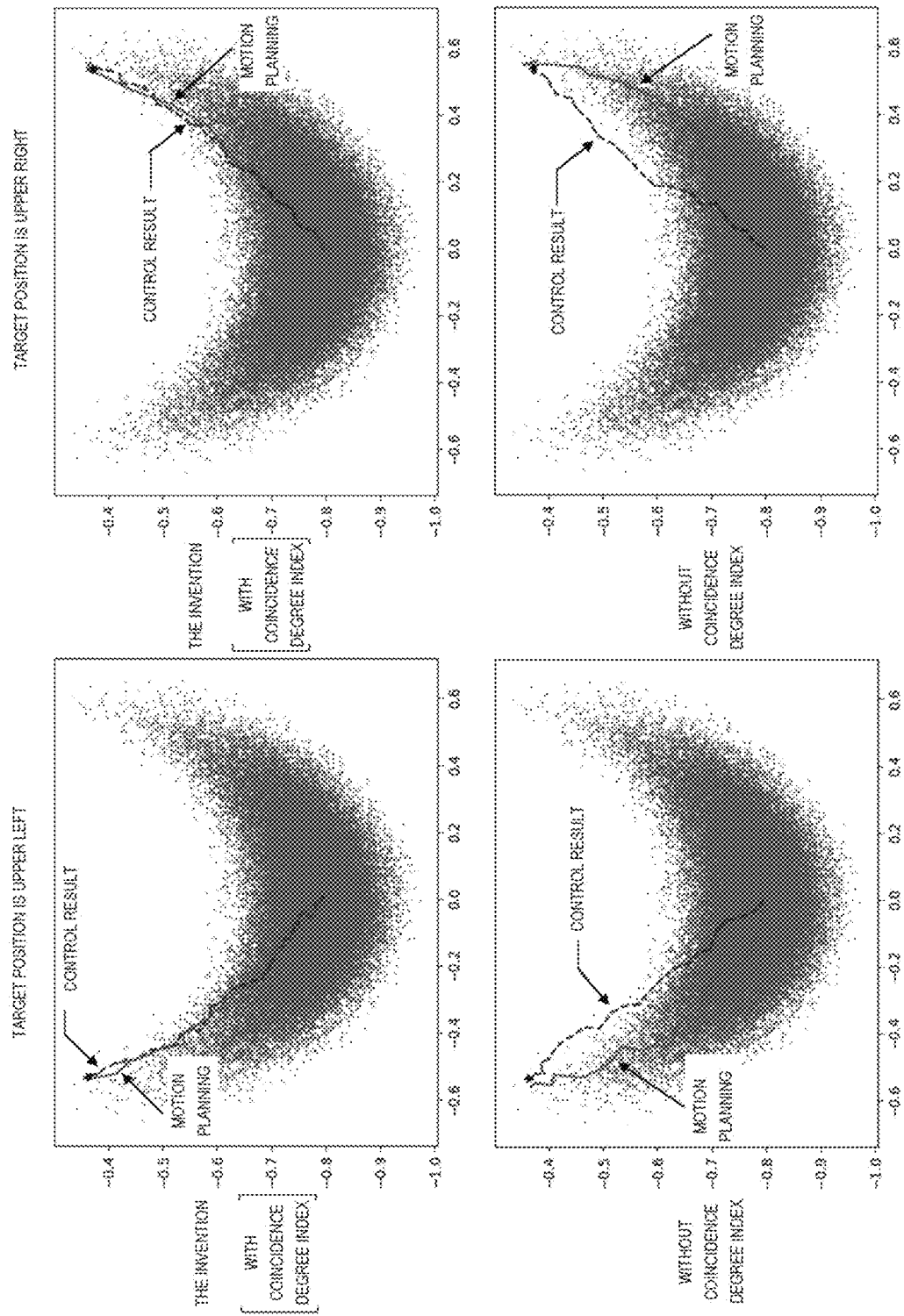
FIG. 11 is a diagram showing loci by a simulation experiment of the invention which uses a coincidence degree index and a simulation experiment in a case of only a distance without using the coincidence degree index.

FIG. 11 is a diagram showing loci by a simulation experiment of the invention which uses a coincidence degree index and a simulation experiment in a case of only a distance without using the coincidence degree index in the motion planning and the control result.

Two diagrams on the upper side of FIG. 11 are cases of the invention (with the coincidence degree index), and two diagrams on the lower side of FIG. 11 are cases of only the distance without using the coincidence degree index (without the coincidence degree index). In the diagrams, a solid line is a locus in the case of the motion planning, and a broken line is a locus of the control result (the same applies to loci shown in FIGS. 12 to 14 below).

Two diagrams on the left side of FIG. 11 show a reaching motion in which the target position is set to the upper left, the center is a start point, and the upper left is a goal point (target position); the two diagrams on the right side of FIG. 11 show a reaching motion in which the target position is set to the upper right, the center is the start point, and the upper right is the goal point (target position).

In the experiment, similar to the robot finger shown in FIGS. 1 to 3, a vertical link is controlled, that is, a motion is generated by controlling 6 links. A motion observation of the robot is a 16-dimensional observation of two-dimensional positions and velocities of four points shown by rhombus symbols in FIGS. 1 to 3. FIG. 11 shows an example of a locus of a hand position (a rhombus symbol at a lowest position).

As is clear from FIG. 11, in the invention using the coincidence degree index, it can be seen that the difference between the motion planning and the control result is smaller than a case without the coincidence degree index regardless of a case in which the target position is the upper right or the upper left. That is, it is found that the error of the dynamics estimation can be decreased by adding the coincidence degree index.

Next, a display example of the motion planning of the robot will be shown in cases of the reaching motion and a pulling motion.

Figure 12:
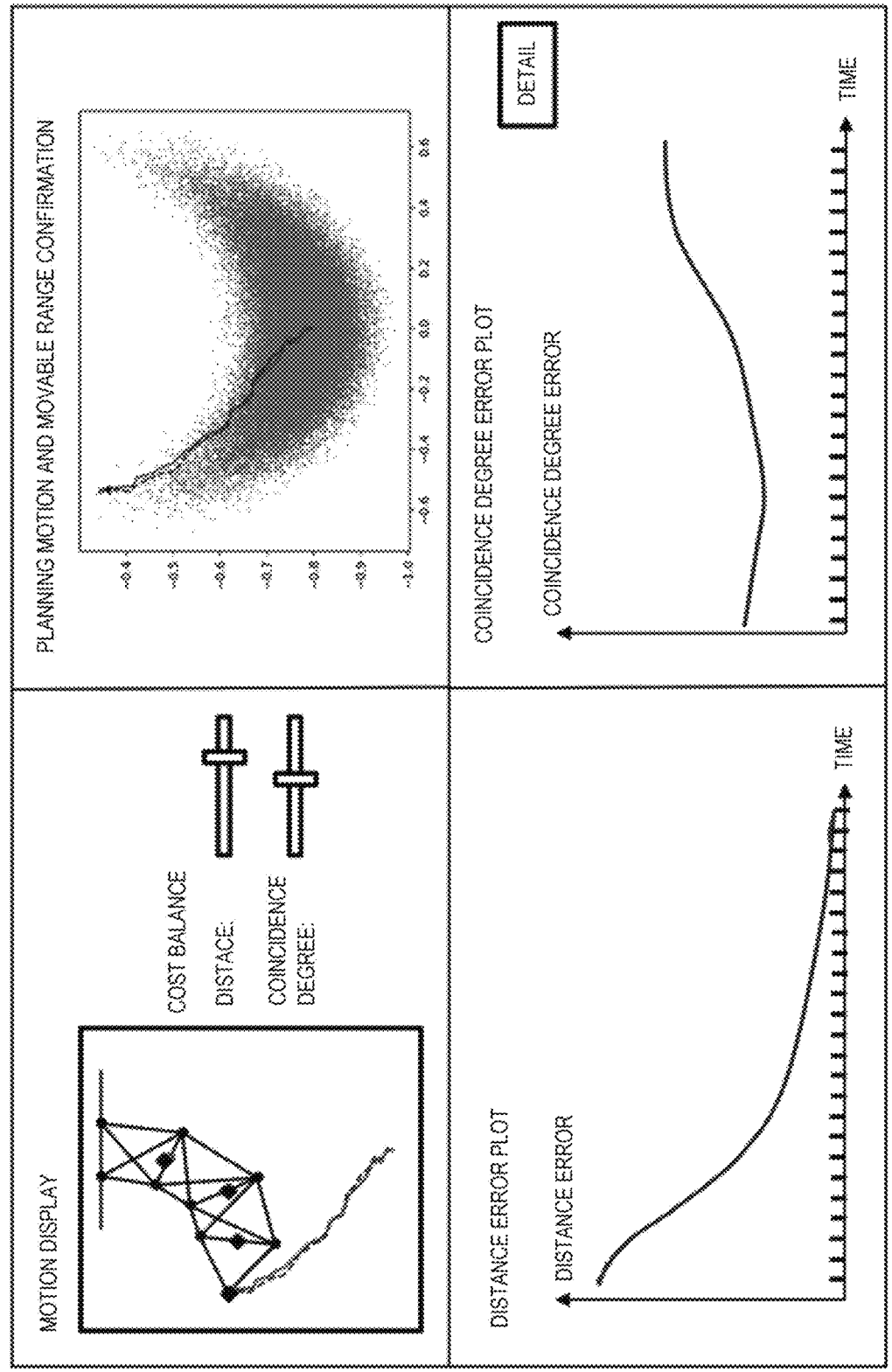
FIG. 12 is a diagram showing an example of a screen that can confirm a reaching motion during motion planning.

FIG. 12 is a diagram showing an example of a screen that can confirm the reaching motion during the motion planning.

On the screen shown in FIG. 12, it is possible to confirm a motion generation result and a current motion of a simulator. The upper left screen of FIG. 12 displays the motion generation result, and the distance and the coincidence degree can be variably adjusted in order to observe the balance with the cost balance. Similar to FIG. 11, the upper right screen of FIG. 12 displays that a movable range can be confirmed based on the motion planning and the control result. The time transition of the distance error is plotted on the lower left screen of FIG. 12, and the time transition of the coincidence degree error is plotted on the lower right screen of FIG. 12. The detailed pull down on the lower right screen is provided to display the coincidence degree error for a specific joint.

Figure 13:
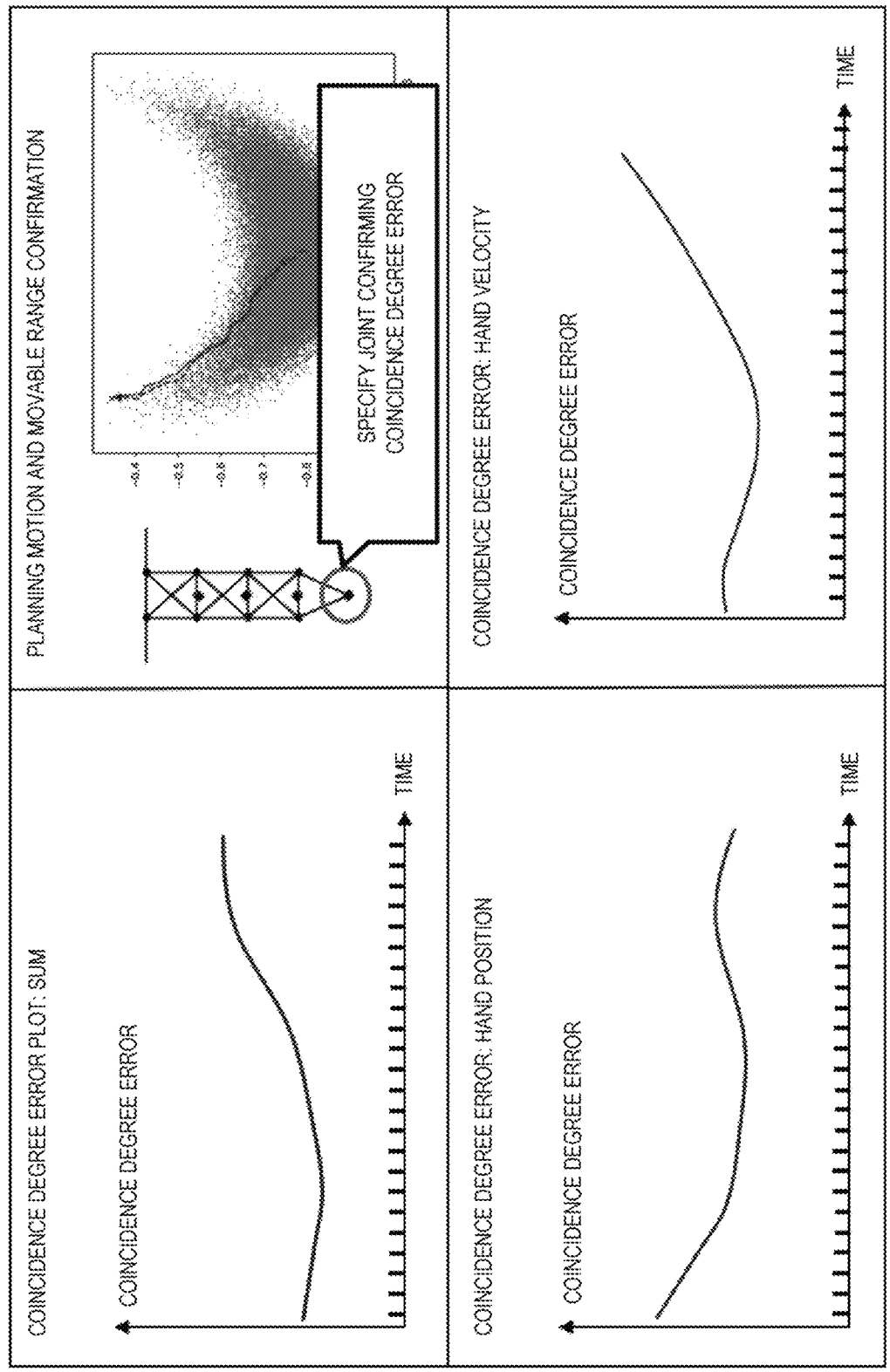
FIG. 13 is a diagram showing an example of a screen that can confirm a coincidence degree error of each feature amount for the reaching motion.

FIG. 13 is a diagram showing an example of a screen that can confirm a coincidence degree error of each feature amount for the reaching motion.

On the screen shown in FIG. 13, it is possible to confirm a detail motion of a joint to be confirmed by specifying the joint. The upper right screen of FIG. 13 displays that a movable range can be confirmed based on the motion planning and the control result, and displays parts related to each joint so that the joint for which the coincidence degree error is confirmed can be specified. The upper left screen of FIG. 13 plots a sum of the coincidence degree errors, the lower screens of FIG. 13 display coincidence degree errors of the position (lower left screen) and the velocity (lower right screen) of a part related to the specified joint (the hand part in FIG. 13).

Figure 14:
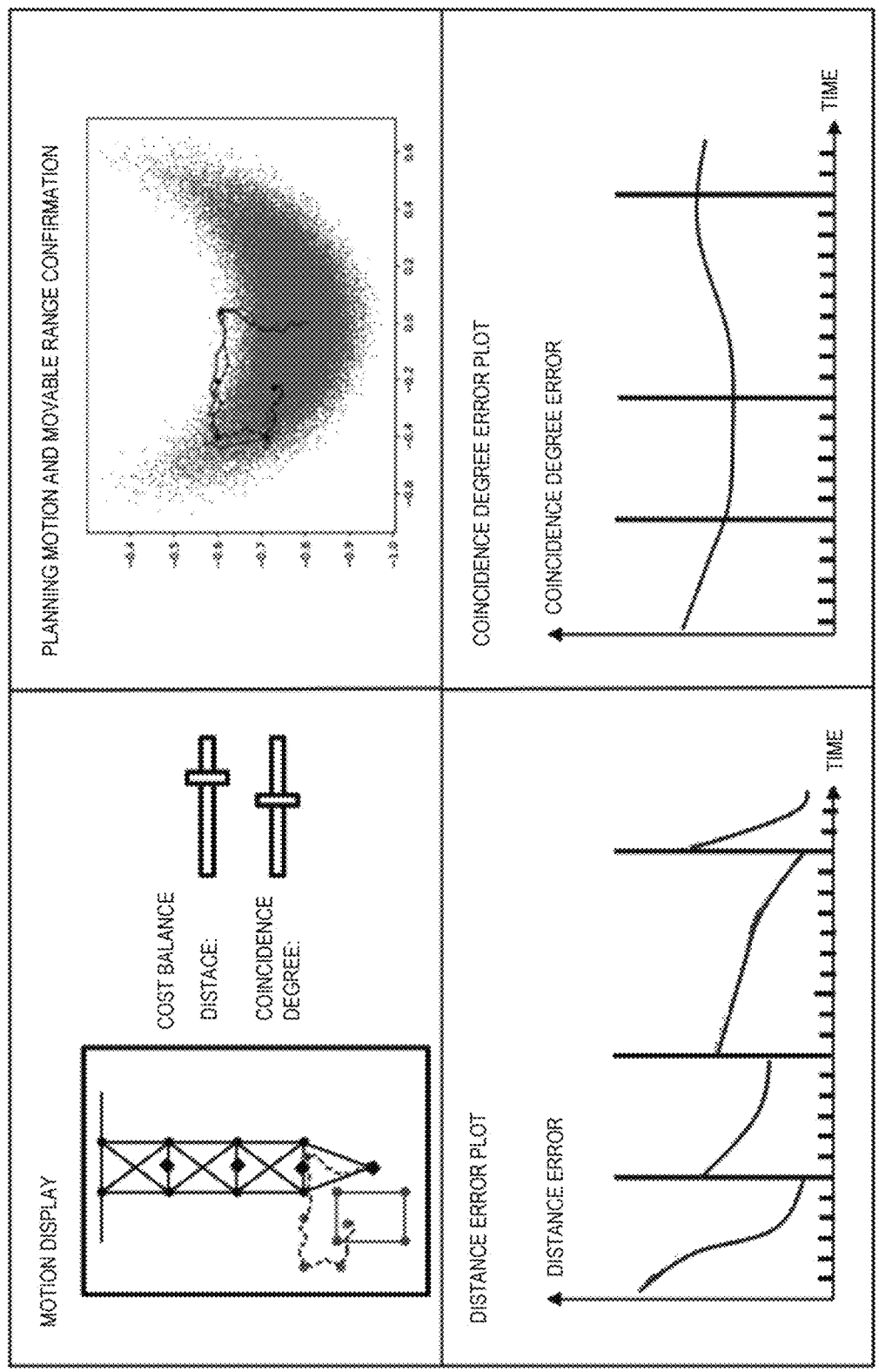
FIG. 14 is a diagram showing an example of a screen that can confirm a pulling motion during the motion planning.

FIG. 14 is a diagram showing an example of a screen that can confirm a pulling motion (a pulling motion of a box placed on a floor on the left side) during the motion planning. The screen shown in FIG. 12 is displayed during the pulling motion.

On the screen shown in FIG. 14, it is possible to confirm a minimum error amount, a best parameter, the arrangement of search points, and the like for each space leading up to the pulling during the pulling motion. FIG. 14 shows an example of displaying the movement of the hand part, and the lower screen displays the time transition of each error for each space by plots as a distance error plot (lower left screen) and a coincidence degree error plot (lower right screen).

As mentioned above, for motion planning of a robot having a non-linear element in which modeling is not easy, the invention can generate a motion that facilitates modeling and has few errors by adding the coincidence degree index in the robot state estimation to the cost function.

What is claimed is:

1. A robot control system comprising:
a memory coupled to a processor, the memory storing instructions that when executed by the processor, configure the processor to:
select a state candidate that is a state transition destination of a robot at a next time from among a plurality of generated state candidates, which are generated by random numbers within a minimum movement amount and a maximum movement amount of a state of the robot at a current time, each generated state candidate corresponds to one of a plurality of dots in a disk-shape sampling centered on the state at the current time,
estimate a control amount for transitioning to the state candidate,
calculate a distance between a target state of the robot and the state candidate,
calculate a coincidence degree between (i) a state at the next time estimated from the state at the current time of the robot and the control amount and (ii) the state candidate, and set a sum of the distance and the coincidence degree as an evaluation value,
select a state candidate with a minimum evaluation value from state candidates, and control the robot to move to the selected state candidate.

2. The robot control system according to claim 1, wherein the processor is configured to use a machine learning model to estimate the control amount.

3. The robot control system according to claim 1, wherein the processor is configured to use a machine learning model to estimate the state at the next time.

4. The robot control system according to claim 1, further comprising:
a display coupled to the processor,
wherein the processor is configured to display on the display errors of a result of controlling the robot to move, the distance, and the coincidence degree.

5. A robot control method comprising:
a first step of selecting a state candidate that is a state transition destination of a robot at a next time from among a plurality of generated state candidates, which are generated by random numbers within a minimum movement amount and a maximum movement amount of a state of the robot at a current time, each generated state candidate corresponds to one of a plurality of dots in a disk-shape sampling centered on the state at the current time;

a second step of estimating a control amount for transitioning to the state candidate;

a third step of calculating a distance between a target state of the robot and the state candidate, calculating a coincidence degree between (i) a state at the next time estimated from the state at the current time of the robot and the control amount and (ii) the state candidate, and setting a sum of the distance and the coincidence degree as an evaluation value; and a fourth step of selecting a state candidate with a minimum evaluation value from state candidates; and a fifth step of controlling the robot to move to the selected state candidate.

6. The robot control method according to claim 5, wherein in the second step, the control amount is estimated using a machine learning model.

7. The robot control method according to claim 5, wherein in the third step, the state at the next time is estimated using a machine learning model.

8. The robot control method according to claim 5, further comprising:

displaying, on a display, errors of a result of controlling the robot to move, the distance, and the coincidence degree.

\* \* \* \* \*